United States Patent
Shibata

(10) Patent No.: US 12,002,278 B2
(45) Date of Patent: *Jun. 4, 2024

(54) OBJECT RECOGNITION BY FAR INFRARED CAMERA

(71) Applicant: Hitachi Astemo, Ltd., Hitachinaka (JP)

(72) Inventor: Takeo Shibata, Hitachinaka (JP)

(73) Assignee: Hitachi Astemo, Ltd, Hitachinaka (JP)

( * ) Notice: Subject to any disclaimer, the term of this patent is extended or adjusted under 35 U.S.C. 154(b) by 212 days.

This patent is subject to a terminal disclaimer.

(21) Appl. No.: 17/624,168

(22) PCT Filed: Apr. 16, 2020

(86) PCT No.: PCT/JP2020/016724
§ 371 (c)(1),
(2) Date: Dec. 30, 2021

(87) PCT Pub. No.: WO2021/002083
PCT Pub. Date: Jan. 7, 2021

(65) Prior Publication Data
US 2022/0366699 A1   Nov. 17, 2022

Related U.S. Application Data

(63) Continuation of application No. 16/503,287, filed on Jul. 3, 2019, now Pat. No. 11,023,743.

(51) Int. Cl.
*H04N 5/33*  (2023.01)
*G01J 5/10*  (2006.01)
(Continued)

(52) U.S. Cl.
CPC .............. *G06V 40/103* (2022.01); *G01J 5/10* (2013.01); *G05D 1/0242* (2013.01); *G06F 18/24* (2023.01);
(Continued)

(58) Field of Classification Search
None
See application file for complete search history.

(56) References Cited

U.S. PATENT DOCUMENTS 5,289,275 A * 2/1994 Ishii ................. G06V 40/10
348/154
11,023,743 B2 * 6/2021 Shibata ............... G06V 40/103
(Continued)

FOREIGN PATENT DOCUMENTS

JP   2009-301494 A   12/2009
JP   2010-20557 A    1/2010
(Continued)

OTHER PUBLICATIONS

Japanese Patent Office, Notice of Reasons for Refusal, Application No. JP2021-573828, dated Oct. 4, 2022, in 8 pages.
(Continued)

*Primary Examiner* — Eileen M Adams
(74) *Attorney, Agent, or Firm* — PROCOPIO, CORY, HARGREAVES & SAVITCH LLP

(57) ABSTRACT

Example implementations described herein are directed to integration of far infrared cameras in a vehicle system to detect objects based on relative temperature of objects. Such implementations can improve accuracy when paired, for example, with classification systems that classify objects based on the shape of the object, as both the shape and relative temperature can be used to ensure that the classification is accurate. Further, example implementations can synchronize far infrared cameras with other sensor systems to determine distance, energy, and absolute temperature of an object, which can also be used to enhance classification. Such classifications can then be provided to an advanced driver assistance systems (ADAS), which can control the vehicle system in accordance with the object classification.

15 Claims, 8 Drawing Sheets

(51) Int. Cl.
  *G05D 1/00*    (2006.01)
  *G06F 18/24*   (2023.01)
  *G06F 18/25*   (2023.01)
  *G06T 7/593*   (2017.01)
  *G06V 10/143*  (2022.01)
  *G06V 20/56*   (2022.01)
  *G06V 20/58*   (2022.01)
  *G06V 40/10*   (2022.01)
  *G01J 5/00*    (2022.01)
(52) U.S. Cl.
  CPC .............. *G06F 18/25* (2023.01); *G06T 7/593* (2017.01); *G06V 10/143* (2022.01); *G06V 20/56* (2022.01); *G06V 20/58* (2022.01); *H04N 5/33* (2013.01); *G01J 2005/0077* (2013.01); *G06T 2207/10012* (2013.01); *G06T 2207/10024* (2013.01); *G06T 2207/10048* (2013.01); *G06T 2207/20212* (2013.01); *G06T 2207/30252* (2013.01)

(56) References Cited

U.S. PATENT DOCUMENTS

2010/0052885 A1*  3/2010  Hanqvist .............. G01J 5/0022
                                                         348/148
2020/0294245 A1   9/2020  Oyaizu et al.
2020/0410274 A1   12/2020 Satoh et al.

FOREIGN PATENT DOCUMENTS

JP    2013042404 A    2/2013
WO    2019/069581 A1  4/2019
WO    2019/111464 A1  6/2019

OTHER PUBLICATIONS

Patent Cooperation Treaty, International Search Report, Application No. PCT/JP2020/016724, dated Jul. 21, 2020, in 3 pages.

* cited by examiner

OBJECT RECOGNITION BY FAR INFRARED CAMERA

BACKGROUND

Field

The present disclosure is generally directed to a vehicle driving control apparatus, and more particularly to an object recognition apparatus for determining a classification from a relative temperature of an object.

Related Art

In the related art, object recognition systems and methods are configured to recognize an object based on the color or contrast of an object reflected on a visible light camera. Such object recognition systems and methods can judge the classification of an object from the shape of an object.

However, in the related art, it can be difficult to judge the classification from the shape of the part of object (e.g., if the object is obstructed by another object or by image interference/noise). In addition, recognition conducted on individual image frames tends to have low reliability. Several frames of images are required to obtain sufficient reliability, so related art recognition techniques have a problems in finding objects without incurring severe delay.

In addition, the images from the visible light camera can be affected by direct sunlight and head lights of an oncoming vehicle, which reduces the recognition rate for systems and methods that utilize visible light cameras. Further, when far infrared cameras involving a smaller number of pixels than visible light cameras are used, the distance accuracy of the object is worse compared to the visible light camera.

SUMMARY

Example implementations described herein are directed to systems and methods to improve the recognition rate, recognition speed, and distance accuracy of an object by utilizing a far infrared camera or using it together with conventional sensing.

In the first example implementation, the classification of the object is judged from the shape of the object, wherein the classification is related to a relative temperature zone determined from measuring the relative temperature of the object. Thus when the relative temperature of another object coincides with the relative temperature zone that was previously associated with the classification, the reliability for determining objects of the same classification can thereby be improved.

In a second example implementation, the systems and methods described herein extracts the distance of the object grouped by the relative temperature image of the far infrared (FIR) camera with the distance image of the stereo camera, by overlapping the relative temperature image from a synchronized FIR camera along with the stereo camera distance image and a color image without parallax. By overlapping the relative temperature image of the FIR camera synchronized with the stereo camera and the distance and color image of the stereo camera, the distance of the object is grouped with the relative temperature image of the FIR camera, and can thereby be detected by the distance image of the stereo camera.

In a third example implementation, the FIR camera (FIR-F) is installed so as to take a part of the vehicle body, and the relative temperature information of the FIR camera (FIR-F) is converted into absolute temperature information by measuring the temperature of the photographed body with a thermometer and matching the absolute temperature with the relative temperature of the FIR camera (FIR-F). When the FIR camera (FIR-R) is installed so that part of FIR camera (FIR-F) image and image of FIR camera (FIR-R) overlap, the relative temperature information of the FIR camera (FIR-R) is converted into the absolute temperature information by matching the absolute temperature of the FIR camera (FIR-F) and the relative temperature of the FIR camera (FIR-R).

In a fourth example implementation, when having information on the distance and the absolute temperature of the object, the energy amount released by the object in one second can be obtained from the relational expression of "$E=\delta T\bigcirc 4*4\pi R\bigcirc 2$". The table in which the energy range and the classification of the object are previously correlated is prepared and the reliability of the object is improved when the energy of the target object is within the energy range associated with each classification.

In a fifth example implementation, when the classification of the target object is specified, the energy range of the object can be obtained from the table. When the absolute temperature of the target object is known, the range of the distance can be obtained from the relational expression.

Aspects of the present disclosure can involve a vehicle system, involving one or more far infrared (FIR) cameras; and a processor, configured to conduct object classification for a first object detected from one or more images of the one or more FIR cameras to classify the first object, based on a shape of the first object; determine a relative temperature range of the first object; associate the relative temperature range of the first object to the classification of the first object; and for a second object detected from the one or more images of the one or more FIR cameras having the relative temperature range of the first object, recognize the second object as having the classification of the first object.

Aspects of the present disclosure further include a computer program, storing instructions for executing a process for a vehicle system with one or more far infrared (FIR) cameras, the instructions involving classifying a first object detected from one or more images of the one or more FIR cameras; and for a second object detected from the one or more images of the one or more FIR cameras having a relative temperature range coinciding with the first object, recognizing the second object as having the classification of the first object. The instructions may be incorporated into a non-transitory computer readable medium.

Aspects of the present disclosure further include a method for a vehicle system with one or more far infrared (FIR) cameras, the method involving classifying a first object detected from one or more images of the one or more FIR cameras; and for a second object detected from the one or more images of the one or more FIR cameras having a relative temperature range coinciding with the first object, recognizing the second object as having the classification of the first object. The instructions may be incorporated into a non-transitory computer readable medium.

Through the example implementations described herein, object recognition and detection can be implemented more reliably and accurately in vehicle systems, which assists in advanced driver assistance systems (ADAS).

DETAILED DESCRIPTION

Figure 1:
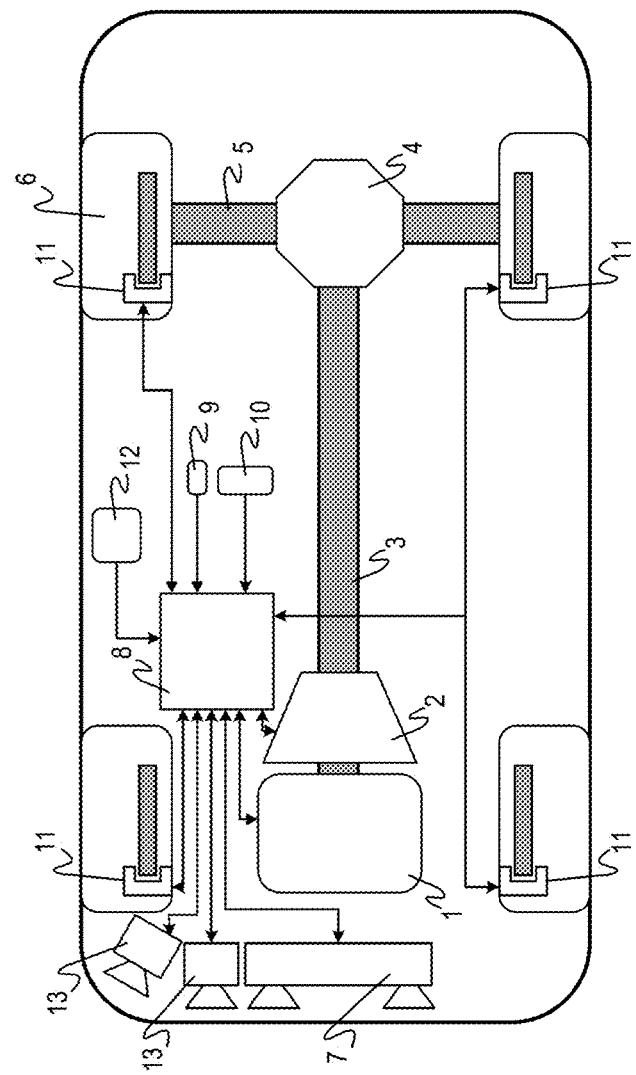
FIG. 1 illustrates an example schematic configuration of a vehicle provided with a vehicle control device according to an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

FIG. 1 shows a schematic configuration of a vehicle system in the form of a vehicle provided with a vehicle control device according to an example implementation. In the example of FIG. 1, the vehicle is a rear wheel drive vehicle having a general configuration including the engine 1 as a power source, the automatic transmission 2 as a drive system, the propeller shaft 3, the differential gear 4, and the drive shaft 5, and involves a drive wheel by the engine 1 which drives the wheel 6.

The one or more stereo cameras 7 and the one or more far infrared cameras 13 are attached to the front portion of the vehicle, and these sensors calculate the position and relative speed of a preceding vehicle ahead, a pedestrian, a lane, an obstacle, an oncoming vehicle and so on in accordance with the desired implementation. However, depending on the desired implementation, distance measurement may also be performed by using an external recognition sensor such as light detection and ranging (LiDAR), sonar, radar, or a monocular camera instead of, or in addition to the stereo camera 7.

The electronically controlled brake system 11 is a hydraulic brake system capable of controlling individual braking forces respectively applied to the wheels. The electronically controlled brake system applies braking forces to either the right wheels or the left wheels in response to a turning request to apply a yawing moment to the vehicle.

The vehicle is provided with an operation parameter measuring unit for measuring values of parameters indicating the operating condition of the vehicle, which can include wheel speed measuring device 9, and vehicle behavior measuring device 10. Signals provided by those devices are sent to the control unit 8. The vehicle behavior measuring device 10 measures longitudinal acceleration, lateral acceleration and yaw rate.

The vehicle is provided with an information output unit 12. The information output unit 12 displays images, generates sounds and turns on warning lights representing information about supporting operations according to the type of the driving support operation. The information output unit 12 is, for example, a monitor provided with a built-in loud speaker. Plural information output units may be installed in the vehicle.

Figure 2B:
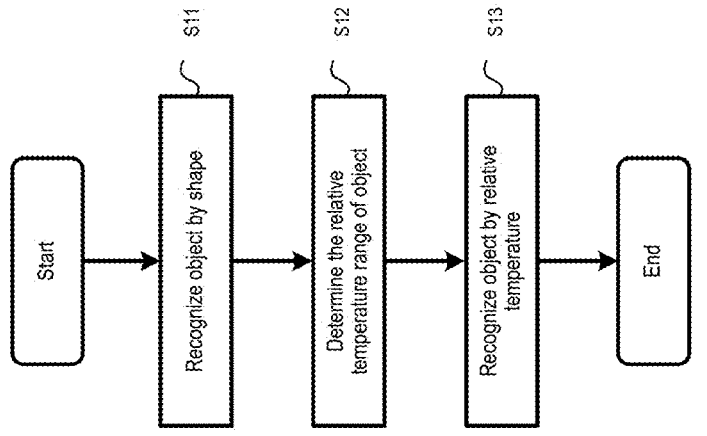
FIGS. 2(a) and 2(b) illustrate example processes and operations of the control unit of the vehicle, in accordance with an example implementation.
Figure 2A:
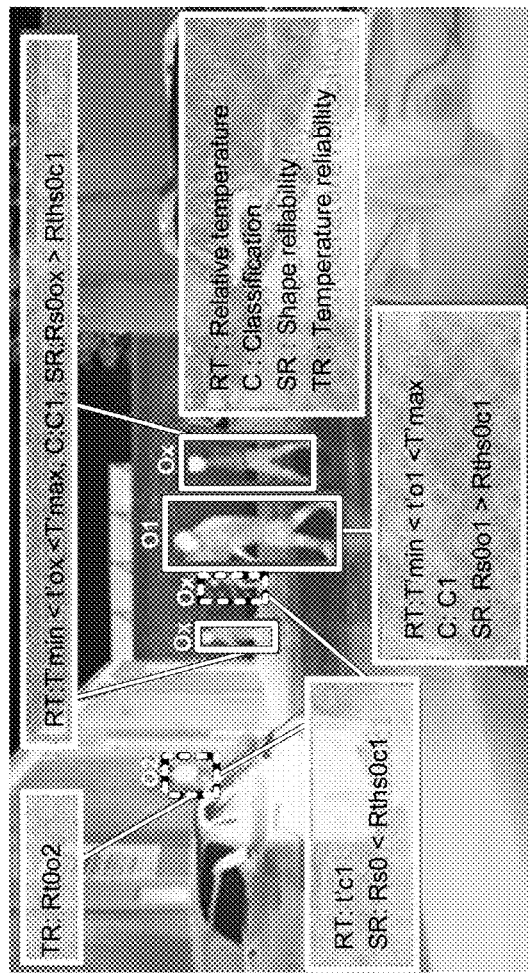

Control unit 8 can be in the form of dedicated hardware such as field programmable gate arrays (FPGAs), hardware processors such as central processing units (CPUs), and/or a combination of hardware and software processors. As will be described herein, control unit 8 is configured to classify a first object detected from one or more images of the one or more far infrared (FIR) cameras 7; and for a second object detected from the one or more images of the one or more FIR cameras having a relative temperature range coinciding with the first object, recognize the second object as having the classification of the first object as illustrated in FIGS. 2(a) and 2(b).

Figure 3:
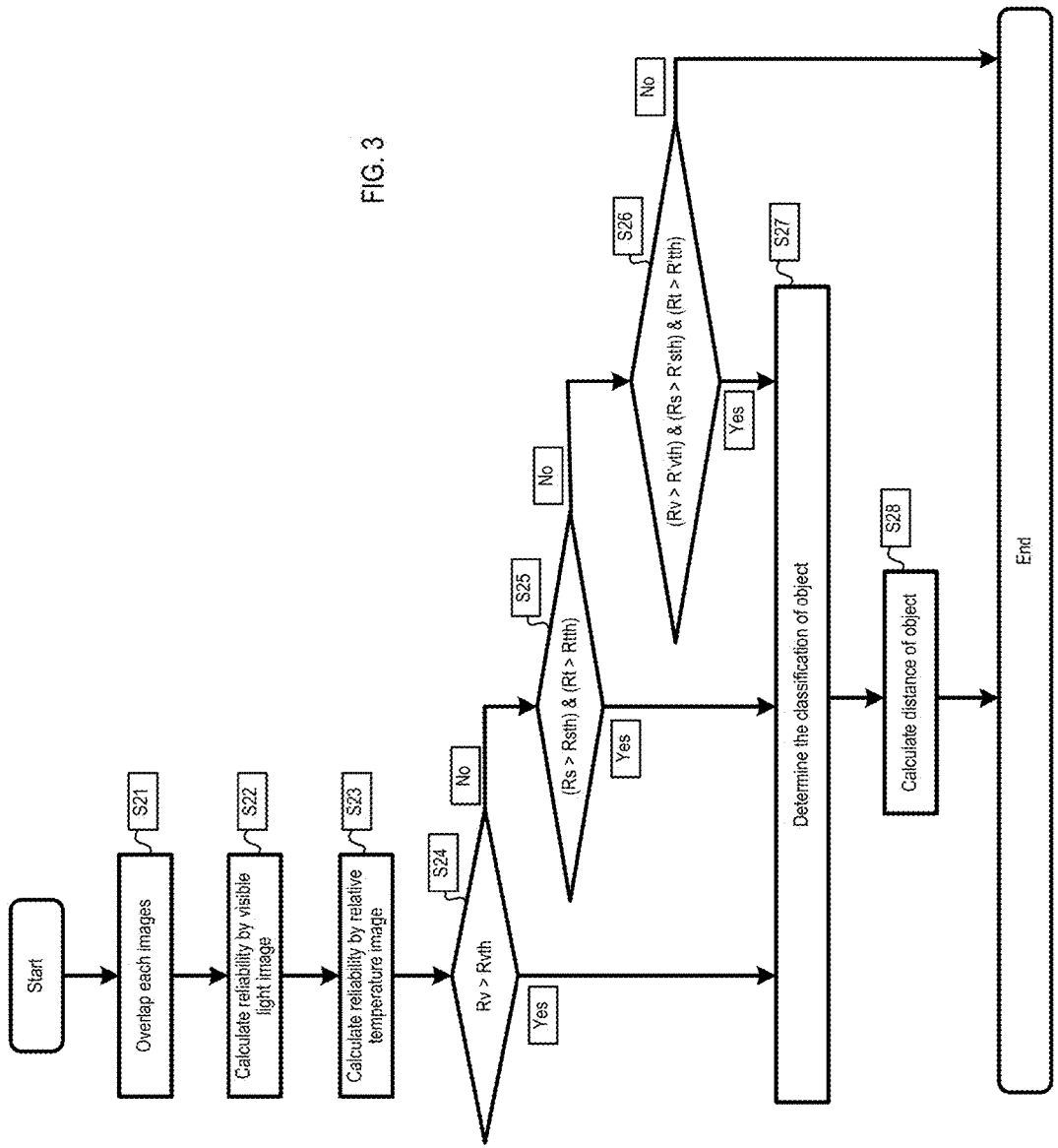
FIG. 3 illustrates a flow diagram from object recognition processing by the control unit of the vehicle system, in accordance with an example implementation.

In an example implementation and as will be described herein, the control unit 8 can be configured to classify the first object detected from the one or more images of the one or more FIR cameras by classifying the first object detected from the one or more images of the one or more FIR cameras based on a shape of the first object; determining a relative temperature range of the first object; and associating the relative temperature range of the first object to the classification of the first object as illustrated in FIG. 3.

Figure 4:
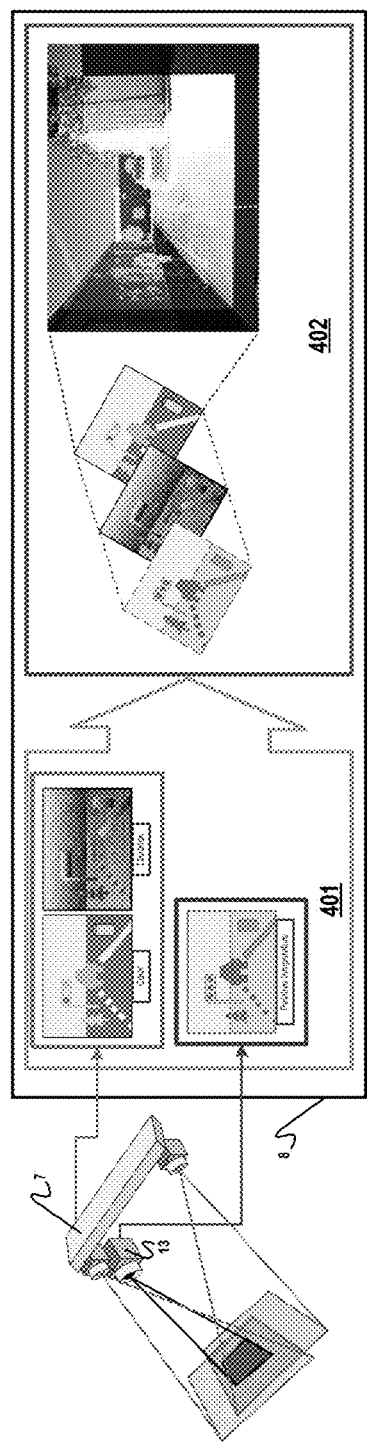
FIG. 4 illustrates an example process to overlap images, in accordance with an example implementation.
Figure 5:
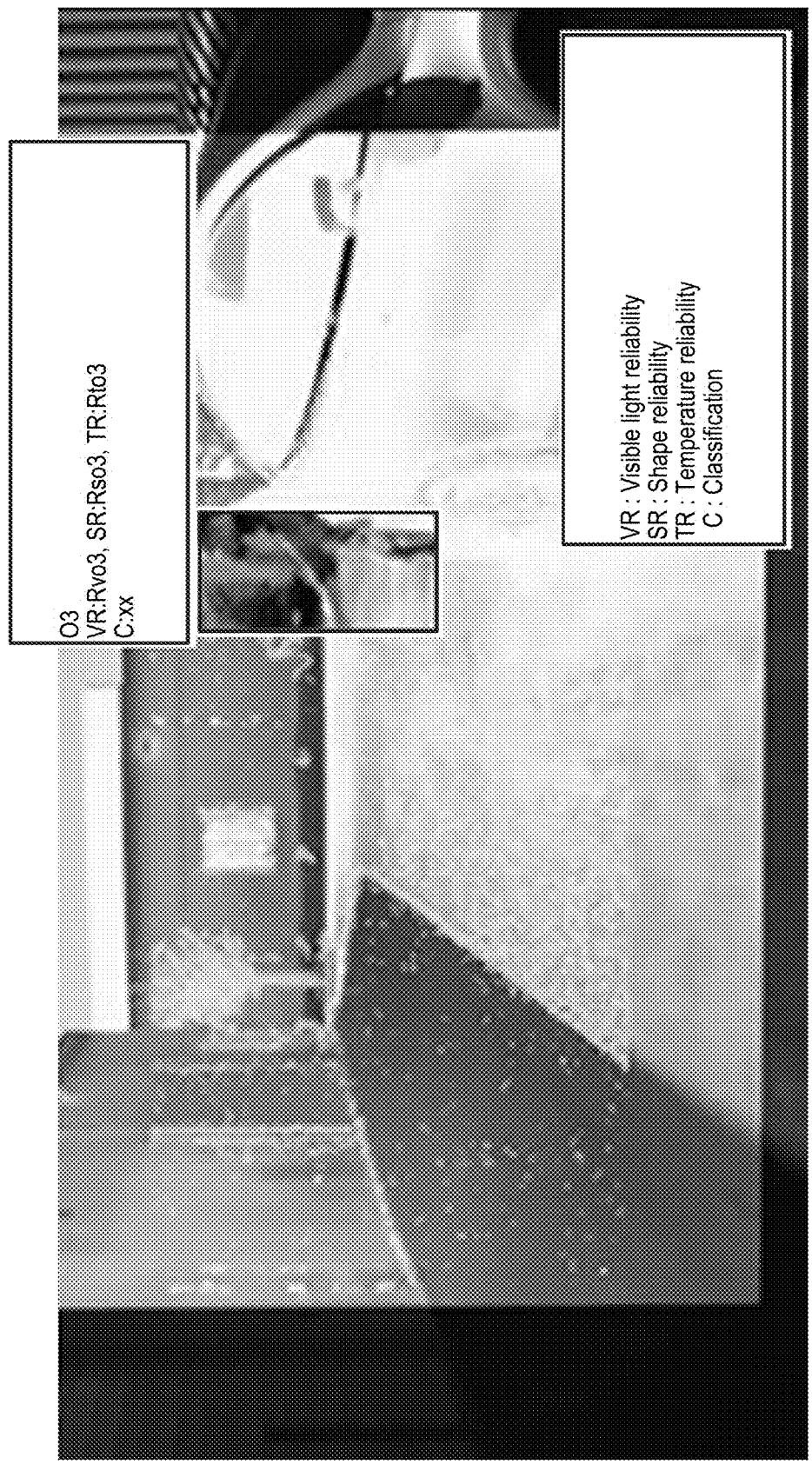
FIG. 5 illustrates an example of visible light reliability, shape reliability and temperature reliability being applied to the classification of an object, in accordance with an example implementation.

In an example implementation and as will be described herein, the vehicle system can also involve an additional sensor system configured to provide image information and distance information, wherein the control unit 8 is configured to synchronize the one or more images of the FIR cameras 7 with the image information and distance information from the sensor system, and classify the first object based on the image information and distance information as illustrated in FIGS. 3-5. Such sensor systems can include, but are not limited to, stereo cameras, LiDAR, sonar, radar, or a monocular camera in accordance with a desired implementation.

In an example implementation and as will be described herein, there can also be a thermometer configured to measure a temperature of a point in proximity to the vehicle system. In such an example implementation, the control unit 8 is configured to determine an absolute temperature range of the first object based on the temperature of the point in proximity of the vehicle system and the relative temperature range of the first object. For the second object detected from the one or more images of the one or more FIR cameras, the control unit 8 is configured to process overlapping ones of the one or more images from multiple ones of the one or more FIR cameras; convert the relative temperature range of the second object into an absolute temperature range of the second object based on the temperature of the point in proximity to the vehicle system and the relative temperature range of the second object; and for the second object having the absolute temperature range of the first object, recognize the second object as having the classification of the first object as illustrated in FIGS. 6-9. Depending on the desired implementation, the thermometer can measure a point in proximity (e.g., on or near the vehicle system) to be used as reference point. For example, depending on the arrangement of the sensors, the thermometer can be configured to measure the temperature of a bonnet, a side mirror, a door handle, or a trunk of the vehicle system, whereupon the sensors and FIR cameras can use the temperature measured therein as a reference point when relative temperature readings are generated with respect to such a temperature point. In another example implementation, if there are sensors and FIR cameras take in images that do not utilize the point in proximity of the vehicle system to determine absolute temperature, then additional sensors or cameras can be used to measure the point in proximity to the vehicle system, and overlapping images between those additional sensors/cameras with the other sensors and cameras can thereby be used to determine absolute temperature.

Figure 8:
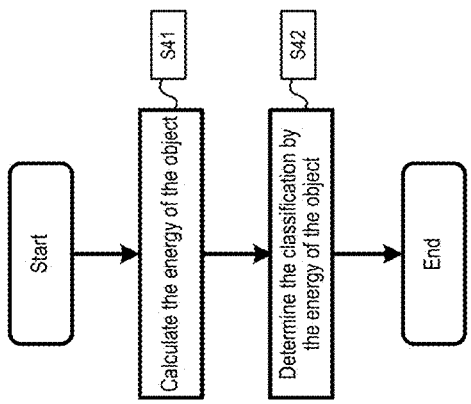
FIG. 8 illustrates an example flow diagram for conducting object classification based on the energy of the target object, in accordance with an example implementation.

In example implementations and as will be described herein, control unit 8 can be configured to determine energy for the first object based on temperature and a distance to the first object; classify the first object detected from one or more images of the one or more FIR cameras based on the energy; and for the second object detected from the one or more images of the one or more FIR cameras having a relative temperature range coinciding with the first object and within an energy range of the first object, recognize the second object as having the classification of the first object as illustrated in FIG. 8.

Figure 9:
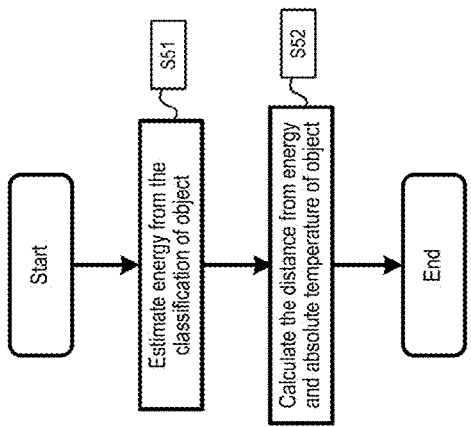
FIG. 9 illustrates an example flow diagram for determining distance of an object from the vehicle through using energy and temperature, in accordance with an example implementation.

In example implementations and as will be described herein, the control unit 8 can be configured to determine an energy range of the second object based on the classification of the first object; and determine a distance range to the second object based on the energy range of the second object and the relative temperature range as illustrated in FIG. 9.

Figure 2C:
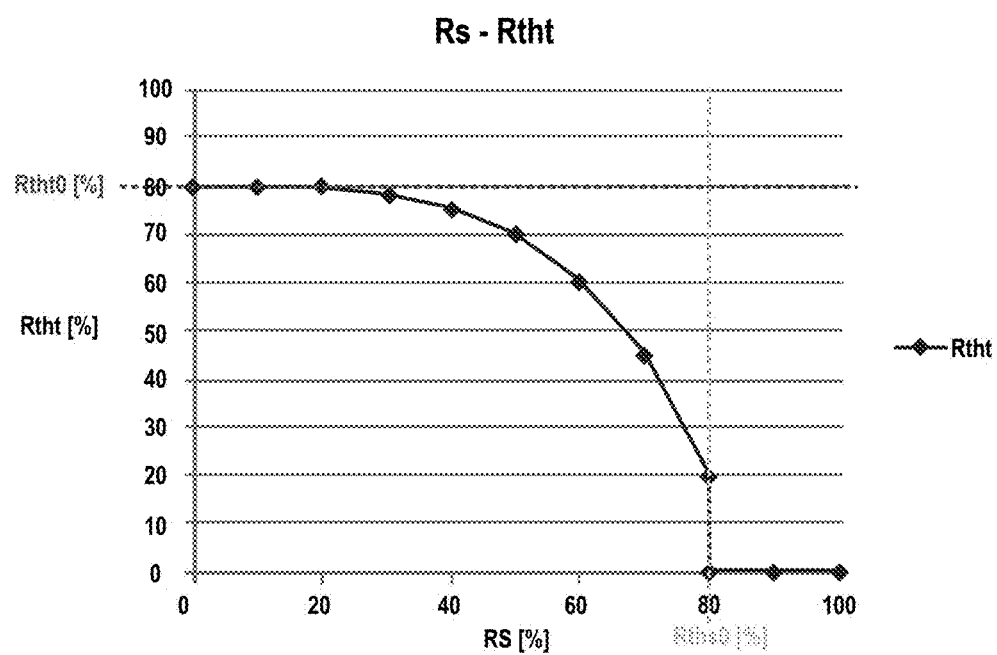
FIG. 2(c) illustrates an example of a phase relation for each object classification, in accordance with an example implementation.

In example implementations and as will be described herein, the control unit 8 can further be configured to, for the second object detected from the one or more images of the one or more FIR cameras not having the relative temperature range coinciding with the first object, recognize the second object based on the relative temperature range in comparison to relative temperature ranges of previous detected objects as illustrated in FIGS. 2(a) to 2(c).

As example implementations described herein utilize temperature ranges, in conjunction with overlapping images from other sensors for object detection, object detection and classification can thereby be improved over system that use visual images only. Depending on the desired implementation, the vehicle system may also involve an advanced driver assistance system (ADAS) configured to control the vehicle system according to the classification of the first object and the second object provided from control unit 8. For example, the ADAS system may cause the vehicle system to slow down if the detected objects are pedestrians or animals that are determined to be at a distance within a threshold.

The vehicle shown here is an example of a vehicle to which example implementations can be applied, however, the present disclosure is not limited thereto and any vehicle configuration can be utilized in accordance with the desired implementation. For example, instead of an engine as a power source, a motor, or an engine and a motor may be provided as a power source instead.

Next, the contents of the object recognition processing of this vehicle control device will be described. FIGS. 2(a) and 2(b) illustrate example processes and operations of the control unit of the vehicle, in accordance with an example implementation. Specifically, FIG. 2(a) illustrates an example far infrared image that is processed for object recognition in accordance with the processes outlined in FIG. 2(b). The flowchart of FIG. 2(b) shows the operation of the control unit 8, and it is repeatedly executed at predetermined time intervals.

At S11, a recognition process is executed to recognize an object by shape through the far infrared camera. If the shape confidence factor $Rs0o1$ of the object O1 is larger than an arbitrary threshold value $Rths0c1$ using the image of the far infrared camera, the object O1 is determined as the classification C1.

Condition 1: $Rs0o1 > Rths0c1$

At this time, since the relative temperature corresponding to the classification C1 is unknown, the relative temperature certainty factor $Rt0$ is 0. Then, the maximum values $T'max$ and $T'min$ of the relative temperature of the recognized object O1 are measured.

At S12, the control unit determines the relative temperature range of the object. Relative temperature offsets $T'omaxc\ 1$ and $T'ominc\ 1$ corresponding to the classification C1 of the object O1 are obtained from table 1 (as illustrated below) of relative temperature offsets corresponding to each kind prepared in advance, and the relative temperature band $t'c1$ is set as condition 2.

TABLE 1

|  | C1 | C2 | C3 | ... |
|---|---|---|---|---|
| T'omax | T'omaxc1 | T'omaxc2 | T'omaxc3 | ... |
| T'omin | T'ominc1 | T'ominc2 | T'ominc3 | ... |

Condition 2: $T'min + T''c1\ omin < t'c1 < T'max + T'c1\ omax$

At S13, groups of pixels corresponding to the temperature width of $t'c1$ are grouped from the image of the far-infrared camera, and when the relative temperature certainty factor $Rt0o2$ of the object O2 in that area is larger than an arbitrary threshold value $Rtht0$, the object O2 is classified C1 as an object.

Condition 3: $Rt0o2 > Rtht0c1$

For Rs and Rtht, there is a phase relation as illustrated in FIG. 2(c) for each classification, Rtht corresponding to Rs can be obtained from Table 2 (illustrated below) which is the data of FIG. 2(c), and when condition 1 for each classification is established, the object has been recognized.

Condition 4: $(Rs > Rths)\ \&\ (Rt > Rtht)$

Therefore, the type of object can be determined from not only the shape but also the relative temperature, which thereby improves the object recognition reliability.

TABLE 2

| Rs (%) | 0 | ... | ... | Rths0 |
|---|---|---|---|---|
| Rtht (%) | Rtht0 | ... | ... | 0 |

Next, the contents of the object recognition processing of this vehicle control device will be described. FIG. 3 illustrates a flow diagram from object recognition processing by the control unit of the vehicle system, in accordance with an example implementation. The flowchart of FIG. 3 shows the operation of the control unit 8, and it is repeatedly executed at predetermined time intervals.

At S21, the received images are overlapped. In an example implementation, the visible light image of the stereo camera 7 and the distance image, the relative temperature image of the far infrared camera 13 are superimposed. An example of the overlapping process is shown in FIG. 4. As shown in FIG. 4, images received from the stereo camera 7 and the far infrared camera 13 are synchronized at 401, wherein color images (e.g., visible light images), distance images, and relative temperature images can be synchronized (e.g., based on time stamp). At 402, based on the timestamp of the images, the images are overlapped to form a composite image as shown in FIG. 4.

At S22, the process calculates the reliability of the object recognition based on the visible light image. Thus, based on the information of the visible light image, the visible light certainty factor Rvo3 of the target object O3 is calculated.

At S23, the process calculates the reliability of the object recognition based on the relative temperature image. Thus, the shape confidence factor Rso3 and the relative temperature certainty factor Rto3 of the target object O3 are calculated based on the information of the relative temperature image. FIG. 5 illustrates an example of visible light reliability, shape reliability and temperature reliability being applied to the classification of an object, in accordance with an example implementation.

At S24 a comparison is made as to whether the visible light certainty factor Rvo3 is larger than a threshold value Rvthc2, which is set in accordance with the desired implementation. If so (Yes), the process proceeds to S27 wherein the object is recognized as the classification C2.

Condition 5: Rvo3>Rvthc2

Otherwise (No), the process proceeds to S25, wherein a determination is made as to whether the shape confidence factor Rso3 is larger than Rsthc2 and the relative temperature certainty factor Rto3 is larger than Rtthc2. If so (Yes) then the process proceeds to S27 wherein object recognition is performed with the target object O3 as the classification C2.

Condition 6: (Rso3>Rsthc2) & (Rto3>Rtthc2)

Otherwise (No), the process proceeds to S26, wherein a determination is made as to whether the visible light certainty factor Rvo3 is greater than a threshold value R'vthc2 as set according to a desired implementation, and the shape confidence factor Rso3 is larger than R'sthc2 and the relative temperature certainty factor Rto3 is larger than R'tthc2. If so (Yes), then the process proceeds to S27 wherein target object O3 is recognized as a classification C2. Otherwise (No), recognition cannot be conducted as the system does not recognize the object, and the process ends.

At S28, a process is conducted to calculate the distance of the object based on the distance image. Thus, the object classification is conducted, and the distance between the vehicle and the object can thereby be known.

Figure 6:
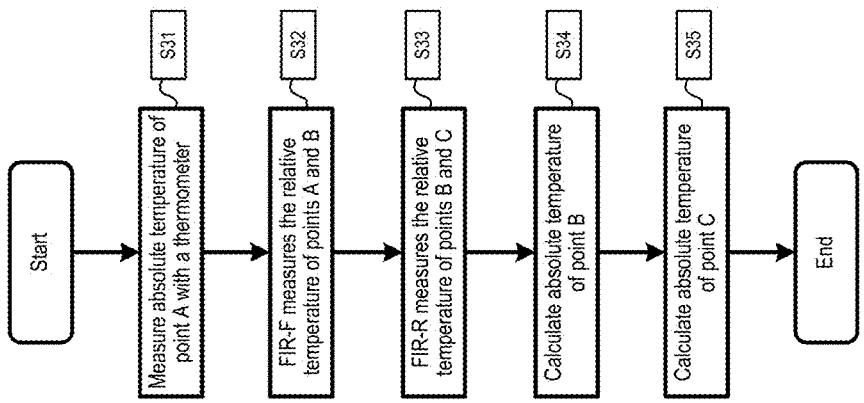
FIG. 6 illustrates an example of executing object recognition processing in the vehicle system, in accordance with an example implementation.

Next, the contents of the object recognition processing of this vehicle control device will be described. FIG. 6 illustrates an example of executing object recognition processing in the vehicle system, in accordance with an example implementation. The flowchart of FIG. 6 shows the operation of the control unit 8, and it is repeatedly executed at predetermined time intervals. The flow of FIG. 6 is made in reference to the detection example as illustrated in FIG. 7.

Figure 7:
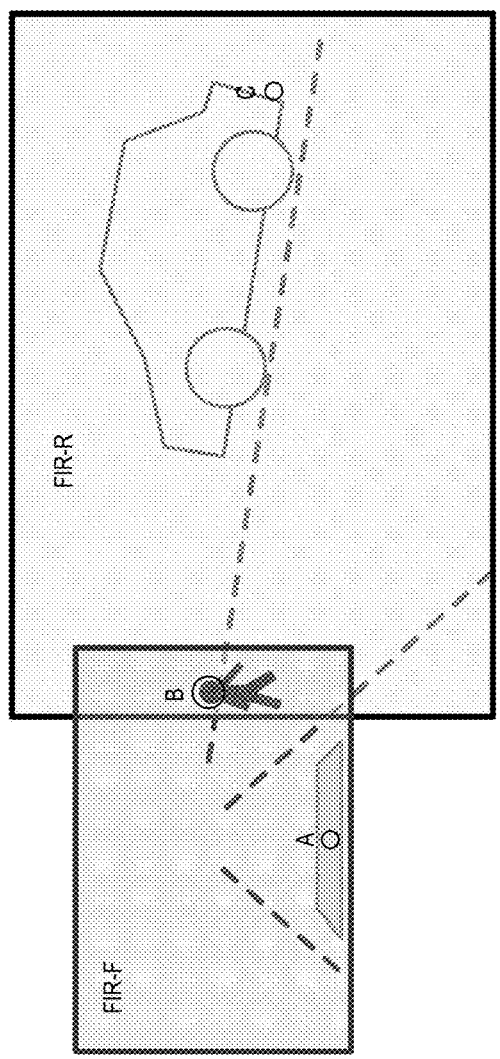
FIG. 7 illustrates a detection example, in accordance with an example implementation.
Figure 7:
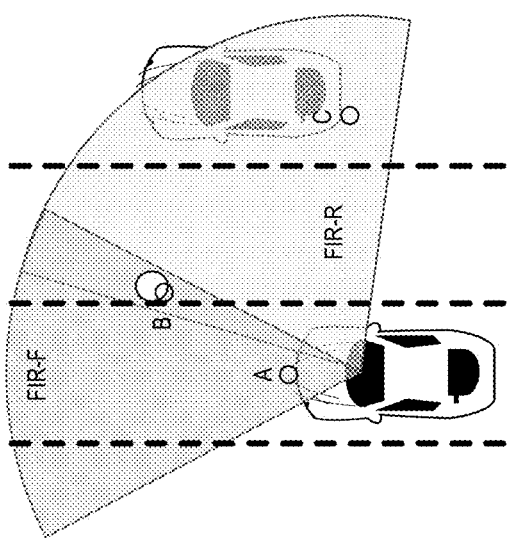

At S31, the absolute temperature Ta of point A in FIG. 7 is measured using a thermometer mounted on the vehicle. At S32, the relative temperature T'fa of the point A and the relative temperature T'fb of the point B are measured using the far infrared camera (FIR-F) as shown in FIG. 7. At S33, the relative temperature T'ra of the point B and the relative temperature T'rb of the point B are measured using the far infrared camera (FIR-R).

At S34, the absolute temperature Tb of the point B is calculated from the equation 1 below.

$$Tb = Ta - (T'fa - T'fb) \quad \text{Equation 1}$$

At S35, the absolute temperature Tc of the point C is calculated from the equation 2 below.

$$Tc = Tb - (T'rb - T'rc) \quad \text{Equation 2}$$

Therefore, it becomes possible to judge the type not only by shape and relative temperature but also by absolute temperature, so that the reliability of object recognition improves.

FIG. 8 illustrates an example flow diagram for conducting object classification based on the energy of the target object, in accordance with an example implementation. The flowchart of FIG. 8 shows the operation of the control unit 8, and it is repeatedly executed at predetermined time intervals.

At S41, the energy of the target object O4 is calculated from the equation 3 below. Equation 3: $E_{o4} = (\delta T_{o4}^4) * 4\pi R_{o4}^2$ At S42, the classification Co4 of the object O4 is determined from Table 3 (beolw) which describes the range of energy corresponding to the classification of the object.

TABLE 3

| Energy | Ec1min-Ec1max | Ec2min-Ec2max | ... |
|---|---|---|---|
| Classification | C1 | C2 | ... |

Through such an example implementation, it therefore becomes possible to determine the type of object not only by shape and temperature, but also by its energy, so that the reliability of object recognition improves.

FIG. 9 illustrates an example flow diagram for determining distance of an object from the vehicle through using energy and temperature, in accordance with an example implementation. The flowchart of FIG. 9 shows the operation of the control unit 8, and it is repeatedly executed at predetermined time intervals.

At S51, the energy corresponding to the type Co5 of the object O5 is determined from Table 4 (below) to determine the energy Eo5 of the object O5. Or if the energy of the object O5 has been measured in the past, then that value can be utilized.

TABLE 4

| Classification | C1 | C2 | ... |
|---|---|---|---|
| Energy | Ec1ave | Ec2ave | ... |

At S52, if it is assumed that the type of the object O5 is C1, Ec1ave is input to E of the equation 4 (below), and the absolute temperature To5 of the object O5 is input to T to calculate the distance Ro5 of the object O5.

$$R_{o5} = \sqrt{\frac{E}{4\pi\delta T^4}} \quad \text{Equation 4}$$

Therefore, even when only the absolute temperature and energy or type of the target object is known, the distance can be calculated, and the accuracy of the distance is improved.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A vehicle system, comprising:
   one or more far infrared (FIR) cameras;
   and a processor, configured to:
   classify a first object detected from one or more images of the one or more FIR cameras;
   for a second object detected from the one or more images of the one or more FIR cameras having a relative temperature range coinciding with the first object and within an energy range of the first object, recognize the second object as having a classification of the first object,
   wherein the energy range of the first object is based on a temperature and a distance to the first object; and
   determine an energy range of the second object based on the classification of the first object.

2. The vehicle system of claim 1, wherein the processor is configured to classify the first object detected from the one or more images of the one or more FIR cameras by:
   classify the first object detected from the one or more images of the one or more FIR cameras based on a shape of the first object;
   determine a relative temperature range of the first object; and
   associate the relative temperature range of the first object to the classification of the first object.

3. The vehicle system of claim 1, further comprising a sensor system configured to provide image information and distance information, wherein the processor is configured to synchronize the one or more images of the FIR cameras with the image information and distance information from the sensor system, and classify the first object based on the image information and distance information.

4. The vehicle system of claim 1, further comprising a thermometer configured to measure a temperature of a point in proximity to the vehicle system, wherein the processor is configured to:
   determine an absolute temperature range of the first object based on the temperature of the point in proximity of the vehicle system and a relative temperature range of the first object;
   for the second object detected from the one or more images of the one or more FIR cameras:
   process overlapping ones of the one or more images from multiple ones of the one or more FIR cameras;
   convert the relative temperature range of the second object into an absolute temperature range of the second object based on the temperature of the point in proximity to the vehicle system and the relative temperature range of the second object; and
   for the second object having the absolute temperature range of the first object, recognize the second object as having the classification of the first object.

5. The vehicle system of claim 1, wherein the processor is further configured to:
determine energy for the first object based on the temperature and the distance to the first object; and
classify the first object detected from the one or more images of the one or more FIR cameras based on the energy.

6. The vehicle system of claim 1, wherein the processor is further configured to:
determine a distance range to the second object based on the energy range of the second object and the relative temperature range.

7. The vehicle system of claim 1, further comprising an advanced driver assistance system (ADAS) configured to control the vehicle system according to the classification of the first object and the second object.

8. The vehicle system of claim 1, the processor further configured to:
for the second object detected from the one or more images of the one or more FIR cameras not having the relative temperature range coinciding with the first object, recognize the second object based on the relative temperature range in comparison to relative temperature ranges of previous detected objects.

9. A non-transitory computer readable medium, storing instructions for executing a process for a vehicle system comprising one or more far infrared (FIR) cameras, the instructions comprising:
classifying a first object detected from one or more images of the one or more FIR cameras;
for a second object detected from the one or more images of the one or more FIR cameras having a relative temperature range coinciding with the first object and within an energy range of the first object, recognizing the second object as having a classification of the first object,
wherein the energy range of the first object is based on a temperature and a distance to the first object; and
determining an energy range of the second object based on the classification of the first object.

10. The non-transitory computer readable medium of claim 9, wherein the classifying the first object detected from the one or more images of the one or more FIR cameras comprises:
classifying the first object detected from the one or more images of the one or more FIR cameras based on a shape of the first object;
determining a relative temperature range of the first object; and
associating the relative temperature range of the first object to the classification of the first object.

11. The non-transitory computer readable medium of claim 9, the vehicle system further comprising a sensor system configured to provide image information and distance information, wherein the instructions further comprise synchronizing the one or more images of the FIR cameras with the image information and distance information from the sensor system, and classifying the first object based on the image information and distance information.

12. The non-transitory computer readable medium of claim 9, the vehicle system further comprising a thermometer configured to measure a temperature of a point in proximity to the vehicle system, the instructions further comprising:
determining an absolute temperature range of the first object based on the temperature of the point in proximity of the vehicle system and a relative temperature range of the first object;
for the second object detected from the one or more images of the one or more FIR cameras:
processing overlapping ones of the one or more images from multiple ones of the one or more FIR cameras;
converting the relative temperature range of the second object into an absolute temperature range of the second object based on the temperature of the point in proximity to the vehicle system and the relative temperature range of the second object; and
for the second object having the absolute temperature range of the first object, recognizing the second object as having the classification of the first object.

13. The non-transitory computer readable medium of claim 9, the instructions further comprising:
determining energy for the first object based on the temperature and the distance to the first object; and
classifying the first object detected from the one or more images of the one or more FIR cameras based on the energy.

14. The non-transitory computer readable medium of claim 9, the instructions further comprising:
determining a distance range to the second object based on the energy range of the second object and the relative temperature range.

15. The non-transitory computer readable medium of claim 9, the instructions further comprising:
for the second object detected from the one or more images of the one or more FIR cameras not having the relative temperature range coinciding with the first object, recognize the second object based on the relative temperature range in comparison to relative temperature ranges of previous detected objects.

* * * * *